Figure 1:
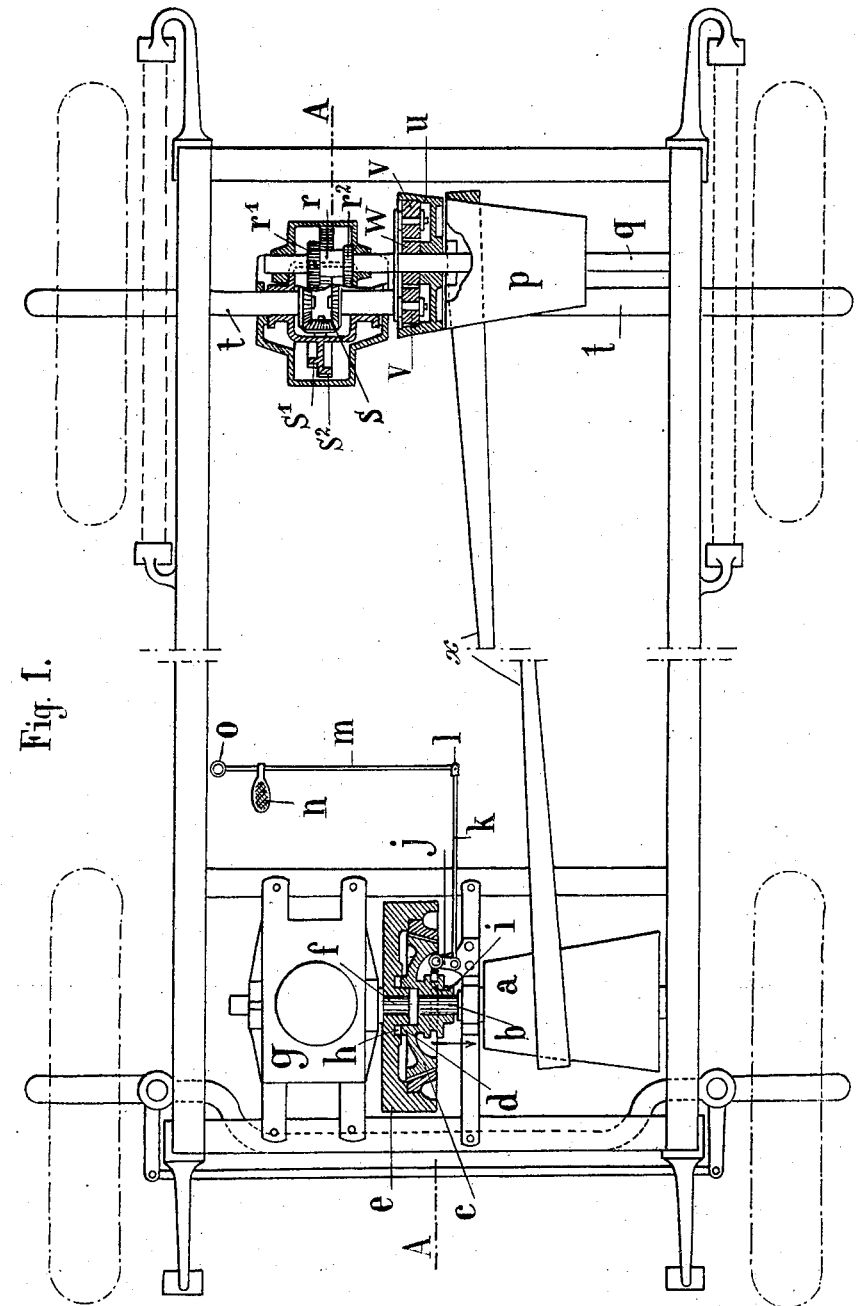

No. 887,001.

PATENTED MAY 5, 1908.

L. E. MAHOUT.
TRANSMISSION MECHANISM.
APPLICATION FILED JAN. 22, 1906.

3 SHEETS—SHEET 1.

WITNESSES.
W. M. Avery
Isaac B. Owens.

INVENTOR
Louis Ernest Mahout
BY
Munn & Co
ATTORNEYS

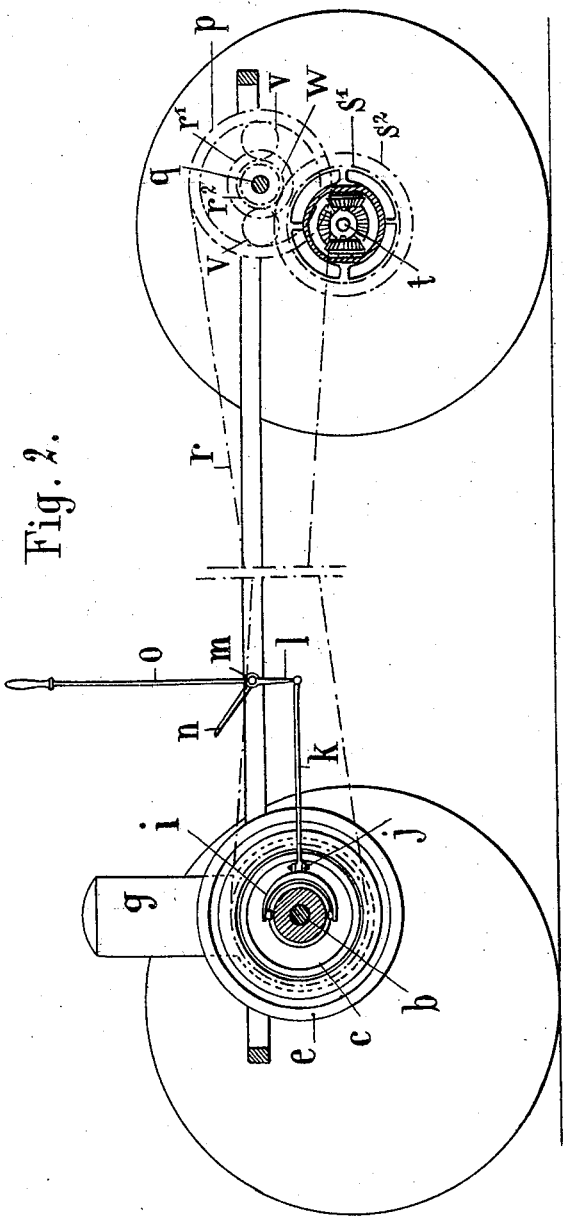

No. 887,001. PATENTED MAY 5, 1908.
L. E. MAHOUT.
TRANSMISSION MECHANISM.
APPLICATION FILED JAN. 22, 1906.

3 SHEETS—SHEET 3.

WITNESSES:
W. M. Avery
Isaac B. Owens.

INVENTOR
Louis Ernest Mahout
BY
Munn & Co
ATTORNEYS

UNITED STATES PATENT OFFICE.

LOUIS ERNEST MAHOUT, OF PARIS, FRANCE.

TRANSMISSION MECHANISM.

No. 887,001.  Specification of Letters Patent.  Patented May 5, 1908.

Application filed January 22, 1906. Serial No. 297,193.

*To all whom it may concern:*

Be it known that I, LOUIS ERNEST MAHOUT, of 10 Rue Léopold Robert, in the city of Paris, Republic of France, have invented an Improved Transmission Mechanism.

As it is known, the transmission of motion by means of gears has the great disadvantage of consuming more than a third and often half the motive power, on the other hand, the speed transformers with moving gear are heavy, expensive, cumbersome and the clutches employed with gears always produce to some extent shocks causing a rapid wear and a disagreeable noise to take place; further so the number of speeds is much restricted; it results therefrom that a run on different kinds of roads causes fatigue due to the varying speeds resorted to at very small intervals of time, and that almost all the time the motor operates in bad conditions, works hard or runs too fast and becomes heated. Therefore the change of speed by means of gears is inconvenient, expensive and dangerous.

Experiments have been made in order to obtain progressive speeds by the use of cones located opposite to one another and of belts but heretofore this mode of transmission has not given good results for following reasons: The small linear speed of the belt, the inclination and relative position of the cones, the arrangement of axes near to one another allow but an insufficient adherence. For instance, belts are generally run with one side only on each cone and as a consequence they do not adhere sufficiently to the cones, but are apt to slip easily, whereby their efficiency is impaired. Further, in consequence of the slight adhesion of the belts it is necessary that the cones should have surfaces but slightly inclined, and should therefore be of considerable length, the cones being consequently cumbersome and heavy and capable moreover of permitting only inconsiderable variations of speed. Besides, since each side of the belt works alternately from the greatest diameter of the cone with which it is in contact, it follows that the belt is subjected to a considerable twisting strain, whereby loss in power is caused, as well as elongation and rapid wear of the belt. Furthermore, in the transmission by means of cones, as the latter are always strictly in front of one another, and as the flat belt always tends to work in the direction of the greatest diameter, it follows that the said belt constantly bears against the guiding forks whereby loss in power, as well as elongation and rapid wear of the belt are caused.

It is further to be observed that in the ordinary transmissions by means of cones and belts, the receiving cone is supported from an intermediate shaft and transmits its motion to the shaft of the differential by means of gears and chains.

The present invention relates to an apparatus for the transmission of motion with progressive speeds by means of cones and belts doing away with the above mentioned disadvantages. This system of transmission is essentially characterized by following features:

1st. The relative position of the cones which are shifted so that the belt will run in a position of equilibrium without requiring any guiding and consequently without friction.

2nd. The use of a crossed belt of trapezoidal section adapted to present an inclined working face in order to compensate for the inclination of the cones. All points on the internal surfaces of the belt which are in contact with the cones have therefore always the same linear speed as the points on the surfaces of the cones with which they come into contact, so that neither slip, not torsion of the belt occurs, and further, the outer surface of the belt remains parallel with the axle of the cones and thus insures a uniform grip throughout the whole width of the belt. Consequently the belt normally performs work throughout its entire width and is not submitted to any lateral force which would tend to cause it to slip over the cones. Cones may therefore be employed whereof the angle is wider than heretofore and consequently a greater range of variation in speed than that obtainable with the ordinary belt and cone transmission, is available with cones of smaller dimensions.

3rd. The direct drive of the differential by a pinion firmly secured to the receiving cone for the purpose of doing away with any intermediate part using unnecessary power.

4th. The use of a double clutch with gripping dogs for transmitting the motion to the motive cone for the purpose of obtaining a progressive gripping when starting and the absolute transmission of the motive strain after starting.

Figure 4:
Figure 3:
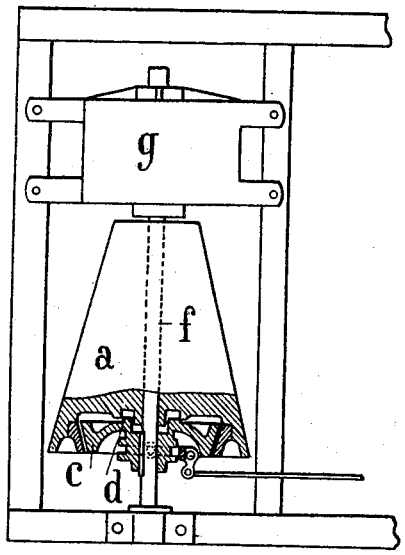

In the accompanying drawing, which illustrates the invention by way of example, Figure 1 is a plan view showing the general arrangement of the mechanism. Fig. 2 is a longitudinal vertical section on line A—A of Fig. 1. Fig. 3 shows a modification, and Fig. 4 is a transverse section of the belt.

As will be seen in the drawing $a$ is a cone keyed upon a shaft $b$ which carries a clutch cone $c$ having gripping dogs $d$ near its center said cone $c$ being capable of longitudinal movement on the shaft $b$, but carrying said shaft with it during its rotation. The cone $c$ is received within a recessed fly-wheel $e$ having an internally conical surface against which the cone $c$ may be caused to abut, said fly-wheel being keyed upon shaft $f$ of the engine $g$, and provided internally with dogs $h$ with which the dogs $d$ of cone $c$ are adapted to engage. The shifting of cone $c$ longitudinally of shaft $b$ is controlled by a fork $i$ having a cranked arm $j$ connected by a rod $k$ to an arm $l$ keyed on shaft $m$ which carries a pedal $n$ and a hand lever $o$. In its intermediate position the cone $c$ is completely disengaged from the fly-wheel $e$. By applying pressure to the pedal $n$ the driver shifts cone $c$ in the direction of the arrow in Fig. 1, thereby causing the engagement of said cone with the internal conical surface of the fly-wheel $c$; the engine being thus caused to engage with cone $a$ progressively by means of a friction clutch formed by the conical surfaces of fly-wheel $e$ and the cone $c$. When the vehicle has been started the driver moves lever $o$ so as to shift cone $c$ in the reverse direction, thus freeing it from the conical surface of the fly-wheel $e$ and throwing the dogs $d$ and $h$ into engagement with one another, so that the power of the engine is transmitted through a positive clutch without loss. The engagements of the dogs $d$ and $h$ is effected without any shock or noise, since it occurs when both series of dogs are traveling at approximately the same angular velocity, or more strictly speaking, when dogs $d$ are traveling at but a slightly lower speed than dogs $h$; this difference in speed which results from the short interval of disengagement which occurs during the change from one gear to the other, insures that the dogs $d$, even if they should be opposite dogs $h$, shall engage therewith. Nevertheless, the difference in speed is so slight as to allow of the engagement being effected without noise. The double clutch can be located as shown in Fig. 3 at the end opposed to the motor in order to have only a single shaft and to avoid the cumbersome use of a supplementary fly-wheel. Cone $a$ transmits the movement which it receives to a cone $p$ keyed on shaft $q$ mounted at the other extremity of the chassis, by means of a crossed belt $x$ of trapezoidal section having an inclined face for compensating the inclination of the cones; this trapezoidal belt may be made of any suitable material and constituted by leather straps, juxtaposed working edgewise and connected together by transverse rivets.

In order that the belt may move easily to take up its position of equilibrium, the two cones $a$ and $p$ are not situated directly opposite to one another but are set out of line as will be seen in Fig. 1. The rear cone $p$ is provided with regulating mechanism whereby it may be shifted laterally along shaft $q$, so that the belt may take up its position of equilibrium and operate without rubbing against the fork which controls its movement along the cones. In order to permit of the greatest possible distance being maintained between cones $a$ and $p$ and to thereby increase the efficiency of the transmission mechanism, the front axle might be cranked towards the forward part of the vehicle as seen in Fig. 1.

The shaft $q$ of the driven cone drives the differential direct by the following means: A sleeve $r$ is mounted so as to slide on said shaft $q$ and to be carried round thereby during its rotation; said sleeve $r$ carries two pinions $r^1$ $r^2$ of different diameters which are adapted to be brought into gear with toothed wheels $s^1$ $s^2$ carried by the differential $s$ mounted on axle $t$; the ratio of the teeth of pinion $r^1$ to those of wheel $s^1$ being (say) as 1 to 4 and the ratio of the teeth of pinion $r^2$ to those of wheel $s^2$ being (say) as 1 to 7, so as to allow of the transmittion of a low speed. The range of variation in speed given by the cones is increased by engaging either pinion $r^1$ with wheel $s^1$ or pinion $r^2$ with wheel $s^2$. The same result might be obtained if the pinions $r^1$ $r^2$ were both mounted free on shaft $q$ which would be provided with a clutch having dogs capable of engagement with one or other of these pinions as desired. The efficiency of the cones is thus doubled and the close packing together of the parts is diminished by one half, notwithstanding that the extreme diameters differ but slightly. Further, the linear speed of the belt being by reason of this arrangement greater than heretofore, the efficiency of this transmission is superior, since the coefficient of adhesion of the belt increases considerably with the speed. Again, the fact that the pinions $r^1$ $r^2$ may be disengaged from the toothed wheels $s^1$ $s^2$ of the differential enables the driving axle to run free. Consequently when descending easy gradients the transmission mechanism will no longer, as hitherto, create a passive resistance to the progress of the vehicle.

The invention further comprises reversing mechanism constructed as follows: A conical pulley $u$, whereof the external surface forms a prolongation of cone $p$, is mounted free on shaft $q$, there being but little clearance between the pulley and cone $p$ so that the belt may freely pass from cone $p$ on to pulley $u$ and vice versa. Pulley $u$ has an internal ring of teeth with which two pinions $v$, grouped about and meshing with a toothed wheel $w$ keyed on shaft $q$, are in gear.

In light vehicles, the backward run can be done away as well as the speed change gear. In this case, the axle of the conical drum $p$ will simply carry a pinion meshing directly with the external toothed wheel $s^2$ of the differential. This mechanism operates in the following manner: Assuming the engine to have been started, the driver sets the vehicle gradually in motion by means of the friction clutch which he operates by applying pressure to pedal $n$. This has for effect to bring the friction cone $c$ into contact with the conical internal surface of the fly-wheel $e$ of the engine. When the driving cone $a$ has attained the same speed as the engine shaft the driver operates lever $o$ so as to bring the dogs $d$ into gear with dogs $h$ of fly-wheel $e$; the driving cone $a$ is then rotated by the engine shaft, the friction clutch being employed only in starting. The shifting of the belt along cones $a$ and $p$, combined with the engagement of one or other of pinions $r^1$ $r^2$ with the toothed wheels $s^1$ $s^2$ of the differential, will give an uninterrupted series of progressive speeds with a direct drive at all of them.

In order to maintain the engine at its maximum efficiency, which is also the most economical condition of working, the driver has only to give it once for all its normal feed and thus establishing the dynamic couple. He will then only have to proportion the couple resisting the dynamic couple, in accordance with the contour of the road, which he does by shifting the belt along the cones. When running, therefore, the speed of the vehicle is regulated by means of a single hand lever which may be situated below the steering wheel conveniently near at hand, and which is adapted to operate the fork that controls the belt.

When the driver desires to stop and to reverse the car, instead of disengaging the clutch, he has only to shift the belt towards the smaller end of cone $a$ so as to slacken the speed of the car, and, when the belt bridges cone $p$ and pulley $u$, so these members cause shaft $q$ to turn in opposite directions, it follows that first of all the vehicle is braked and then stopped. By further shifting the belt in the same direction, so as to transfer it completely on to pulley $u$, the car is reversed.

It will thus be seen that the simple shifting of the belt from the one to the other end of cone $a$ in the proper direction, produces a progressive diminution in the speed of the car, then stops it, and finally reverses it. When reversing, the linear speed of the belt is a function only of the diameter of that part of the cone with which it is in contact, and consequently is as great as possible, but the speed of the vehicle is reduced, say three or four times, in accordance with the ratios of the gears. This reduced speed may be employed to help the car to climb backwards up steep slopes (20–25%). When descending easy gradients which are not dangerous, the power expended is diminished and the mechanical output of the vehicle is increased by throwing the driving axle $t$ out of gear and thus avoiding useless running of the transmission mechanism. In the case of sharp gradients, the shifting of the belt in the opposite direction enables the entire engine power to be utilized as brake power without changing the direction of rotation of the engine shaft; thus a reversal similar to that effected by a steam engine is obtained, the engine, although continuing to work in the same direction, acting similarly to a reversible engine. Since the engine operates a pulley whereof the speed of rotation is much greater than that of the ordinary brake drums, it results that a very powerful safety brake is obtained.

Briefly, the present system of transmission by its special combination permits of: 1st. Perfect equilibrium and absolute gripping of the belt in all its positions on the cones. 2nd. A direct drive on the differential at all speeds. 3rd. Clutching the engine progressively when starting, and positive transmission of power after starting. 4th. Changing from forward to backward running without declutching. 5th. Utilizing the engine for braking the vehicle. 6th. Throwing the rear axle of the transmission out of gear when running down easy gradients so that it may run free and the rotation of the transmission mechanism to no purpose be avoided. 7th. Obtaining an increase in the range of variations of speed afforded by the cones with a less crowded arrangement of the mechanism.

Claims:

1. An apparatus for the transmission of motion applicable to automobiles, characterized by the combination of two cones, arranged in front of one another, a shaft upon which the driven cone is slidably mounted a belt connecting the two cones, two pinions of different diameters movable along the shaft of the driven cone, a driven shaft, and two toothed wheels carried by the driven shaft and with which the two pinions can be thrown into mesh, substantially as described.

2. An apparatus for the transmission of motion applicable to automobiles, characterized by the combination of two opposed cones, a shaft upon which the driven cone is slidably mounted a belt connecting these two cones, two pinions of different diameters movable along the shaft of the driven cone, and differential gears with which the said pinions can respectively be thrown into mesh, substantially as described.

3. An apparatus for the transmission of motion applicable to automobiles, characterized by the combination of two cones arranged opposite one another, a shaft upon which the driven cone is mounted, a belt of trapezoidal section whose inner face is presented at an angle to the cones to compensate for the inclination of the latter and connecting these two cones, two pinions of different diameters movable along the shaft of the driven cone, a driven shaft and two toothed wheels carried by the shaft to be driven and with which the said pinions can be thrown into mesh, substantially as described.

4. An apparatus for the transmission of motion applicable to automobiles, characterized by the combination of two cones arranged opposite one another, a belt of trapezoidal section composed of straps arranged edgewise and connecting these two cones, a shaft upon which the driven cone is mounted two pinions of different diameters movable along the shaft of the driven cone, a driven shaft, and two toothed wheels carried by the driven shaft and with which the said pinions can be thrown into mesh, substantially as described.

5. An apparatus for the transmission of motion applicable to automobiles, characterized by the combination of a pair of cones set out of line towards their extremities of greatest diameter, a belt connecting these two cones, a shaft upon which the driven cone is mounted two pinions of different diameters, movable along the shaft of the driven cone, a drive shaft and two toothed wheels carried by the driven shaft and with which the said pinions can be thrown into mesh, substantially as described.

6. An apparatus for the transmission of motion applicable to automobiles characterized by the combination of a pair of cones set out of line towards their extremities of greatest diameter, a belt connecting these two cones, a friction clutch having dogs arranged between the shaft of the motor and the shaft of the driving cone, a shaft upon which the driven cone is mounted two pinions of different diameters movable along the shaft of the driven cone and two toothed wheels carried by the driven shaft and with which the said pinions can be thrown into mesh, substantially as described.

7. An apparatus for the transmission of motion applicable to automobiles, characterized by the combination of a pair of cones set out of line towards their extremities of greatest diameter, a belt of trapezoidal section connecting these two cones, a motor shaft, a friction clutch with dogs arranged between the shaft of the motor and the shaft of the driving cone, a shaft upon which the driven cone is mounted two pinions of different diameters movable along the shaft of the driven cone, a driven shaft, two toothed wheels carried by the driven shaft, and with which the said pinions can be thrown into mesh a pulley for reversing the vehicle, loosely mounted on the shaft of the driven cone adjacent to the base thereof, said pulley being of a diameter equal to the diameter of the base of said cone and having internal teeth, and pinions gearing with these internal teeth, and with a wheel keyed upon the shaft of the driven cone.

The foregoing specification of my apparatus for the transmission of progressive speeds with a direct drive at all speeds, particularly applicable to automobiles, signed by me this 9th day of January 1906.

LOUIS ERNEST MAHOUT.

Witnesses:
   HANSON C. COXE,
   MAURICE H. PIGUET.